US009051951B2

(12) United States Patent
Zhu (10) Patent No.: US 9,051,951 B2
(45) Date of Patent: Jun. 9, 2015

(54) THREADED POST STRUCTURE AND ASSEMBLING STRUCTURE HAVING THE SAME

(71) Applicant: Wistron Corporation, New Taipei (TW)

(72) Inventor: Chong-Xing Zhu, New Taipei (TW)

(73) Assignee: Wistron Corporation, New Taipei (TW)

( * ) Notice: Subject to any disclaimer, the term of this patent is extended or adjusted under 35 U.S.C. 154(b) by 90 days.

(21) Appl. No.: 14/069,383

(22) Filed: Nov. 1, 2013

(65) Prior Publication Data
US 2015/0078862 A1    Mar. 19, 2015

(30) Foreign Application Priority Data
Sep. 16, 2013    (CN) .......................... 2013 1 0421610

(51) Int. Cl.
*F16B 39/32*    (2006.01)
*F16B 7/18*    (2006.01)
*F16B 7/02*    (2006.01)

(52) U.S. Cl.
CPC .. *F16B 7/182* (2013.01); *F16B 7/02* (2013.01)

(58) Field of Classification Search
CPC ........ F16B 37/04; F16B 37/042; F16B 39/02; F16B 39/282; F16B 39/284
USPC ................................. 411/330, 331, 332, 333
See application file for complete search history.

(56) References Cited

U.S. PATENT DOCUMENTS

| | | | | | |
|---|---|---|---|---|---|
| 476,769 | A | * | 6/1892 | Allason | 411/331 |
| 968,171 | A | * | 8/1910 | Lodge | 411/218 |
| 1,358,690 | A | * | 11/1920 | Melton | 411/201 |
| 2,487,219 | A | * | 11/1949 | Butler | 411/290 |
| 3,382,905 | A | * | 5/1968 | Gutshall | 411/198 |
| 5,190,423 | A | * | 3/1993 | Ewing | 411/134 |
| 5,395,192 | A | * | 3/1995 | Bennett | 411/120 |
| 6,010,290 | A | * | 1/2000 | Slesinski et al. | 411/226 |
| 6,976,816 | B2 | * | 12/2005 | Slesinski et al. | 411/122 |
| 6,976,817 | B1 | * | 12/2005 | Grainger | 411/204 |
| 2006/0024148 | A1 | * | 2/2006 | Wei | 411/348 |
| 2006/0225477 | A1 | | 10/2006 | Takemasu et al. | |
| 2012/0063864 | A1 | * | 3/2012 | Hess | 411/326 |

* cited by examiner

*Primary Examiner* — Roberta Delisle
(74) *Attorney, Agent, or Firm* — Jianq Chyun IP Office (57) ABSTRACT

A threaded post structure includes a first threaded post, a second threaded post and a positioning component. The first threaded post has a first internal thread and an external thread. The second threaded post has a second internal thread and at least two positioning portions. The first threaded post and the second threaded post are screwed with each other along an axis through the external thread and the second internal thread. The positioning component is disposed on the first threaded post. When the second threaded post moves to a position along the axis, the positioning component positions one positioning portion to fix the second threaded post at the position. When the second threaded post moves to another position along the axis, the positioning component positions another positioning portion to fix the second threaded post at the another position. Besides, an assembling structure having the threaded post structure is also provided.

17 Claims, 6 Drawing Sheets

THREADED POST STRUCTURE AND ASSEMBLING STRUCTURE HAVING THE SAME

CROSS-REFERENCE TO RELATED APPLICATION

This application claims the priority benefit of China application serial no. 201310421610.4, filed on Sep. 16, 2013. The entirety of the above-mentioned patent application is hereby incorporated by reference herein and made a part of this specification.

BACKGROUND OF THE INVENTION

1. Field of the Invention

The disclosure relates to a threaded post structure and an assembling structure having the same. In particular, the disclosure relates to a threaded post structure in which the length is adjustable and an assembling structure having the threaded post structure.

2. Description of Related Art

In recent years, with advancement of technologies, variety of electronic devices such as smart phones, notebook computers, tablet PC and the like, become more and more popular and have made progress to meet requirements for easy operation, powerful functionality, and embellished exterior design for providing users much more choices.

In general, the electronic devices may be assembled by using threaded posts, and threaded posts with variety lengths are commonly used in assembling of the housing and each component of the electronic devices. Therefore, in the manufacturing and assembling process of the electronic device, it is confusing because there are numerous types of threaded posts, and it may cause placing the threaded posts in wrong positions and the assembling quality may be affected. In addition, the various types of threaded posts having different lengths are difficult to be fabricated in mass production due to the different dimensions, and it may increase the manufacturing cost of the electronic devices.

SUMMARY OF THE INVENTION

The disclosure provides a threaded post structure, which may reduce manufacturing cost and increase assembling quality.

The disclosure provides an assembling structure, wherein the threaded post structure thereof may reduce manufacturing cost and increase assembling quality.

The threaded post structure includes a first threaded post, a second threaded post and a positioning component. The first threaded post has a first internal thread and an external thread. The second threaded post has a second internal thread and at least two positioning portions. The first threaded post and the second threaded post are screwed to each other through the external thread and the second internal thread. The second threaded post is adapted to rotate with respect to the first threaded post and move along an axis to adjust the length of the threaded post structure. The positioning component is disposed on first threaded post. An interference between the positioning component and the first threaded post prevents the positioning component from rotating along the axis. When the second threaded post moves along the axis to a position, the positioning component positions one of the positioning portions to fix the second threaded post at the position. When the second threaded post moves along the axis to another position, the positioning component positions another one of the positioning portions to fix the second threaded post at the another position.

According to an exemplary embodiment of the disclosure, the first threaded post is fixed at a first object, a screw element is screwed to the threaded post structure through the first internal thread, and a second object is sandwiched between the screw element and the second threaded post.

The assembling structure includes a first object, a threaded post structure, a screw element and a second object. The threaded post structure includes a first threaded post, a second threaded post and a positioning component. The first threaded post is fixed on the first object and has a first internal thread and an external thread. The second threaded post has a second internal thread and at least two positioning portions. The first threaded post and the second threaded post are screwed to each other through the external thread and the second internal thread. The second threaded post is adapted to rotate with respect to the first threaded post and move along an axis to adjust the length of the threaded post structure. The positioning component is disposed on first threaded post. An interference between the positioning component and the first threaded post prevents the positioning component from rotating along the axis. When the second threaded post moves along the axis to a position, the positioning component positions one of the positioning portions to fix the second threaded post at the position. When the second threaded post moves along the axis to another position, the positioning component positions another one of the positioning portions to fix the second threaded post at the another position. The screw element is screwed to the threaded post structure through the first internal thread. The second object is sandwiched between the screw element and the second threaded post.

According to an exemplary embodiment of the disclosure, the first threaded post includes a post body and a base body. The first internal thread and the external thread are formed on the post body. The base body is connected to the post body, wherein the positioning component is leaned against the base body and positioned between the base body and the second threaded post.

According to an exemplary embodiment of the disclosure, the positioning component has an opening and is disposed around the post body through the opening, an internal edge of the opening has a first interfering plane, an external edge of the post body has a second interfering plane, an interference between the first interfering plane and the second interfering plane prevents the positioning component from rotating along the axis.

According to an exemplary embodiment of the disclosure, the positioning portions are slots, the positioning component has a stop portion, when one of the slots is aligned with the stop portion with the rotation of the second threaded post, an extension direction of the stop portion is parallel to an extension direction of the corresponding slot, and the stop portion inserts into the corresponding slot.

According to an exemplary embodiment of the disclosure, the positioning component has an elastic arm, and an end of the elastic arm positions one of the positioning portions through an elastic force of the elastic arm.

According to an exemplary embodiment of the disclosure, the first threaded post includes a post body and a base body. The first internal thread and the external thread are formed on the post body. The base body is connected to the post body, wherein the positioning component is leaned against the base body and positioned between the base body and the second threaded post, and the elastic arm extends from the base body to the second threaded post.

According to an exemplary embodiment of the disclosure, the positioning component has an opening and is disposed around the post body through the opening, an internal edge of the opening has a first interfering plane, an external edge of the post body has a second interfering plane, an interference between the first interfering plane and the second interfering plane prevents the positioning component from rotating along the axis.

According to an exemplary embodiment of the disclosure, the positioning portions are slots, the positioning component has a stop portion, when one of the slots is aligned with the stop portion with the rotation of the second threaded post, an extension direction of the stop portion is parallel to an extension direction of the corresponding slot.

In light of the above, the threaded post structure provided in the disclosure includes the first thread post and the second threaded post, and thus the length of the threaded post structure can be adjusted through the relative rotations of first and second threaded posts, in order to meet various assembling requirements. Accordingly, in the assembling of electronic devices, the threaded post structure of the disclosure can replace the conventional threaded posts that their length cannot be adjusted, so that the confusion and mixing up due to the numerous types of threaded posts can be prevented, and the assembling quality may be enhanced. In addition, compared to the various types of conventional threaded posts which have different lengths and are difficult to be fabricated in mass production due to the different dimensions, the threaded post structure of the disclosure can be fabricated in a single process and mass production and provided for assembling the electronic devices, thus the manufacturing cost can be effectively reduced.

To make the above features and advantages of the present invention more comprehensible, several embodiments accompanied with drawings are described in detail as follows.

BRIEF DESCRIPTION OF THE DRAWINGS

The accompanying drawings constituting a part of this specification are incorporated herein to provide a further understanding of the disclosure. Here, the drawings illustrate embodiments of the disclosure and, together with the description, serve to explain the principles of the disclosure.

DESCRIPTION OF EMBODIMENTS

Figure 1:
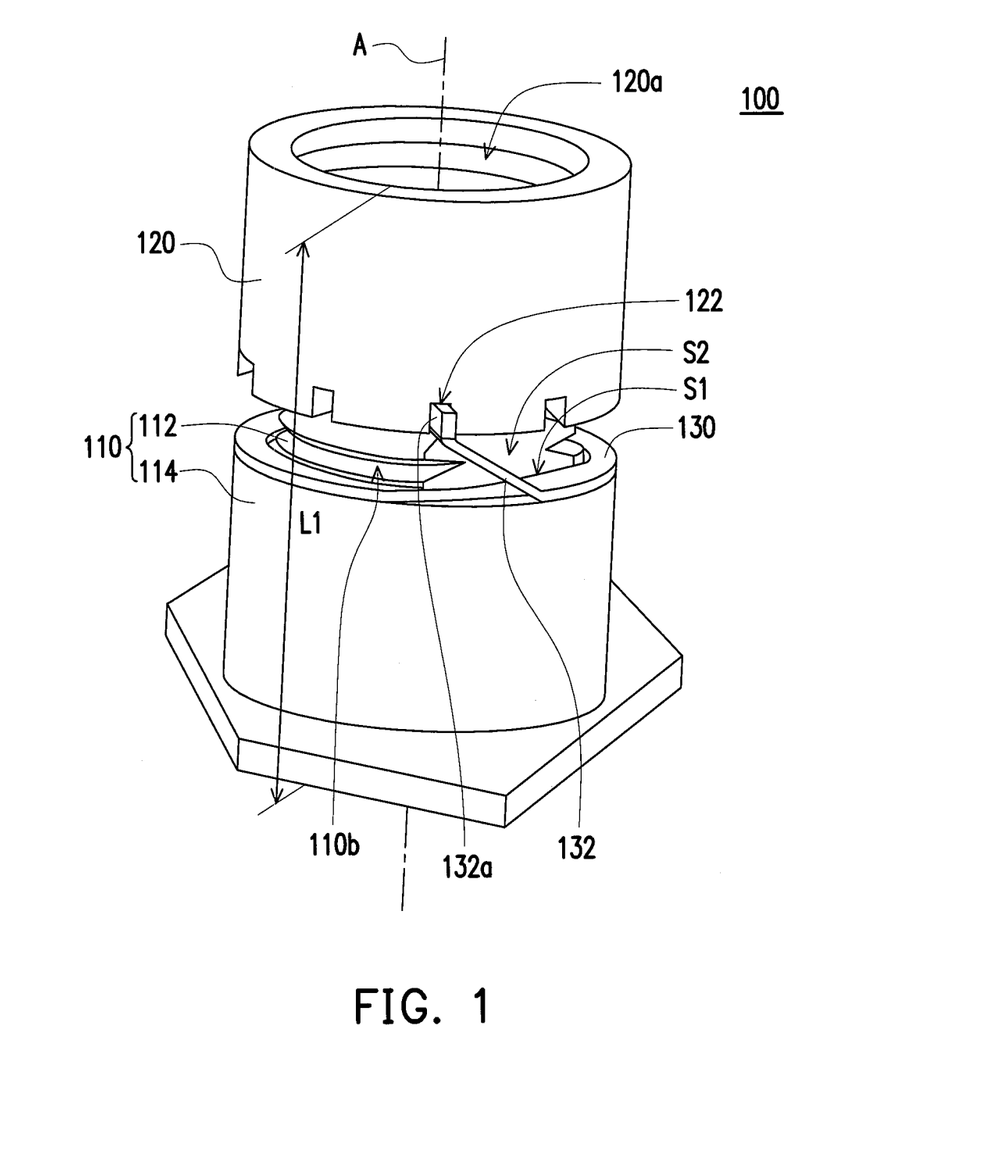
FIG. 1 illustrates a perspective view of a threaded post structure according to an exemplary embodiment of the disclosure.
Figure 2:
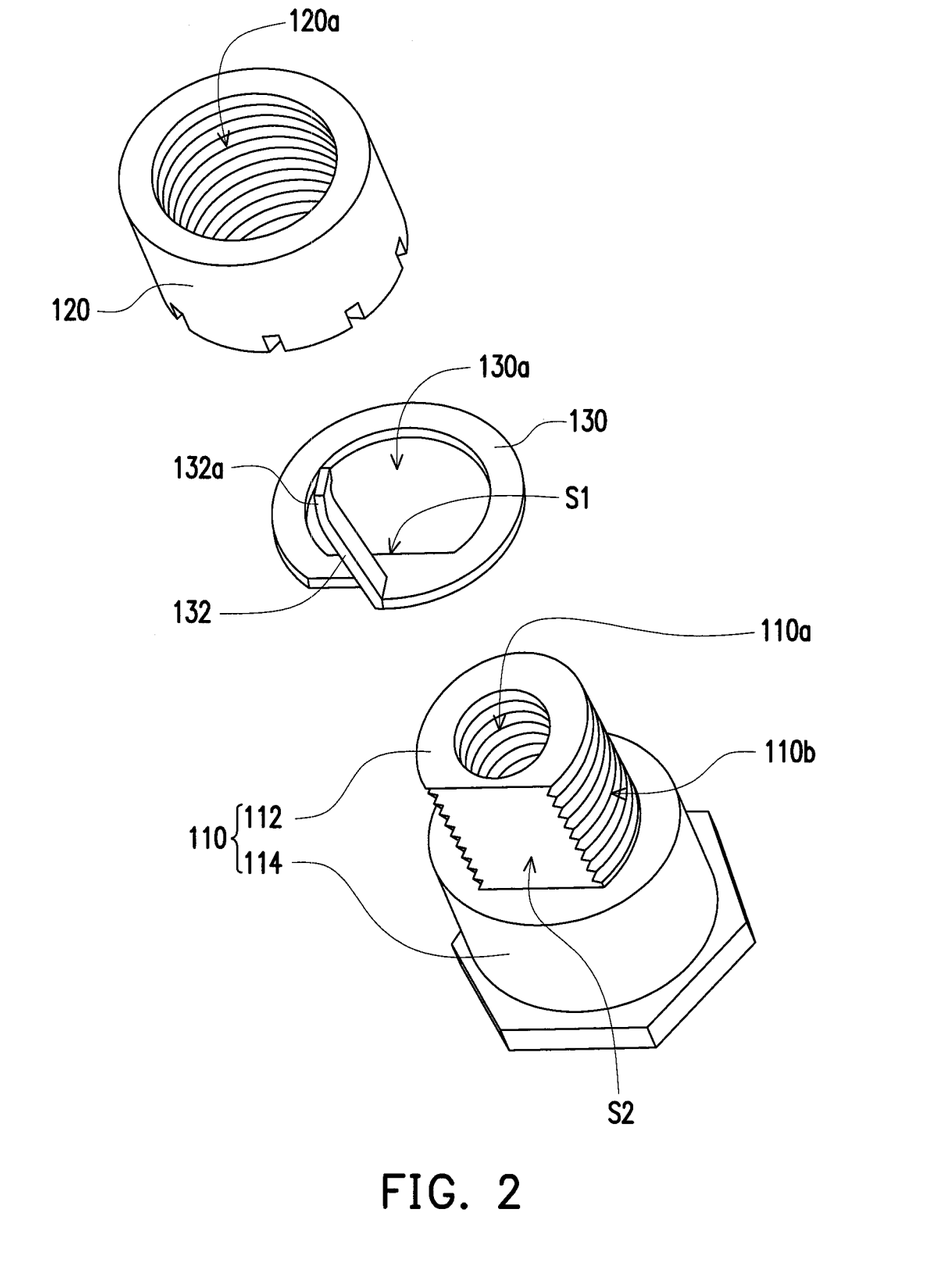
FIG. 2 is an exploded view of the threaded post structure in FIG. 1.

FIG. 1 illustrates a perspective view of a threaded post structure according to an exemplary embodiment of the disclosure. FIG. 2 is an exploded view of the threaded post structure in FIG. 1. Referring to FIG. 1 and FIG. 2, the threaded post structure 100 of the embodiment includes a first threaded post 110 and a second threaded post. The first threaded post 110 includes a post body 112 and a base body 114, wherein the base body 114 is connected to the post body 112, and the post body 112 has a first internal thread 110a and an external thread 110b. The second threaded post 120 has a second internal thread 120a. The first threaded post 110 and the second threaded post 120 are screwed to each other through the external thread 110b and the second internal thread 120a along the axis A.

In such configuration, the length of the threaded post structure 100 may be adjusted through the relative rotations of the first threaded post 110 and the second threaded post 120 along the axis A, in order to meet various assembling requirements. Accordingly, in the assembling of electronic devices, the threaded post structure 100 of the embodiment can replace the conventional threaded posts that their length cannot be adjusted, so that the confusion and mixing up due to the numerous types of threaded posts can be prevented, and the assembling quality may be enhanced. In addition, compared to the various types of conventional threaded posts which have different lengths and are difficult to be fabricated in mass production due to the different dimensions, the threaded post structure 100 of the embodiment may be fabricated in a single process and mass production and provided for assembling the electronic devices, thus the manufacturing cost can be effectively reduced. The detailed assembling way that the threaded post structure 100 is applied in an electronic device is described in the following with figures.

Figure 3:
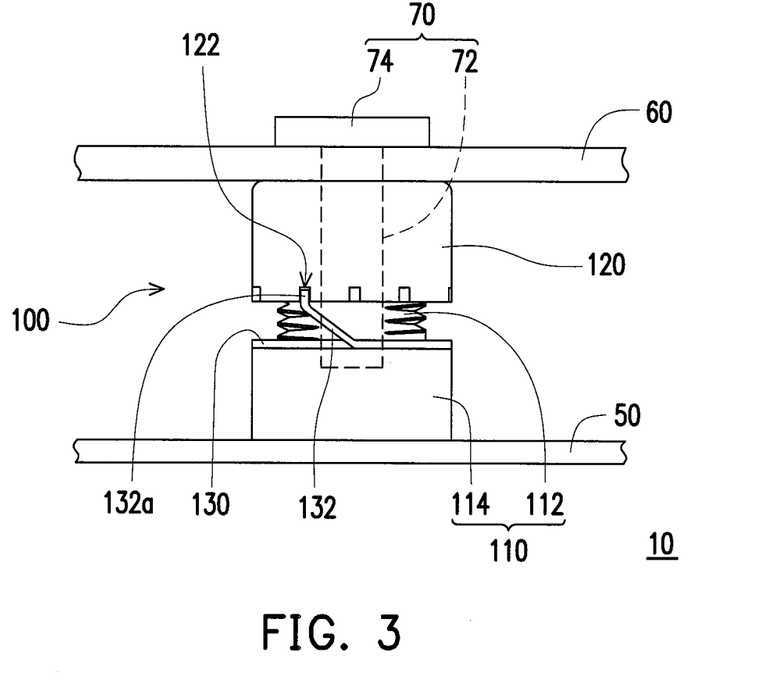
FIG. 3 is a schematic view illustrating the threaded post structure of FIG. 1 applied in an electronic device.

FIG. 3 is a schematic view illustrating the threaded post structure of FIG. 1 applied in an electronic device. Referring to FIG. 3, the electronic device includes a first object 50 and a second object 60, wherein the first object 50 and the second object 60 may be a housing or other type of components of the electronic device, and the disclosure is not limited thereto. The first object 50 and the second object 60 are assembled together through the threaded post structure 100 and a screw element 70. In more detailed, first, the first threaded post 110 may be fixed on the first object 50 by riveting or any other appropriate fixing way, then the second threaded post 120 may be screwed to the first threaded post 110 and the threaded post structure 100 may be adjusted to a required length. Next, the second object 60 is placed on the second threaded post 120, and the screw portion 72 of the screw element 70 is screwed to the threaded post structure 100 through the first internal thread 110a (shown in FIG. 2) of the first threaded post 110. Here, the second object 60 is sandwiched between the head portion 74 of the screw element 70 and the second threaded post 120, so that the first object 50, the second object 60, the screw element 70 and the threaded post structure 100 form an assembling structure 10.

Figure 4:
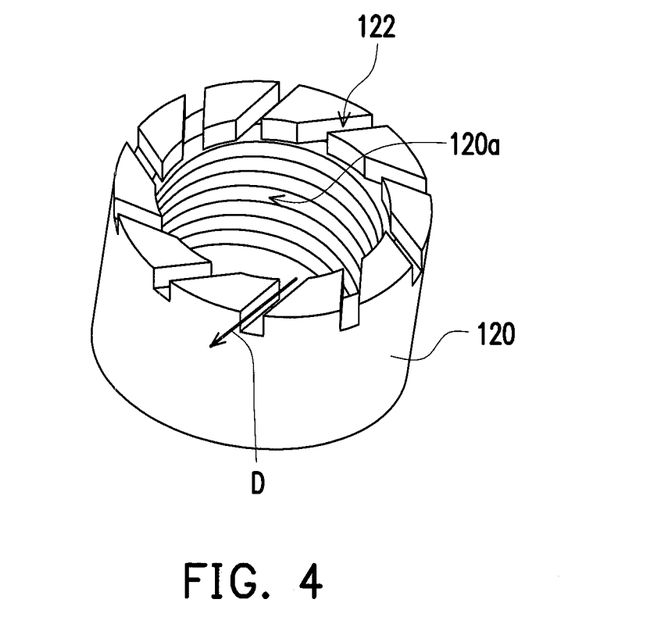
FIG. 4 is a perspective view illustrating the threaded post structure depicted in FIG. 1 from another view angle.

FIG. 4 is a perspective view illustrating the threaded post structure depicted in FIG. 1 from another view angle. Referring to FIG. 1, FIG. 2 and FIG. 3, the second threaded post 120 has a plurality of positioning portions 122 (FIG. 4 illustrates 10 positioning portions 122), and the positioning portions 122 are a plurality of slots, for example. The threaded post structure 100 further includes a positioning component 130, wherein the positioning component 130 is leaned against the base body 114 of the first threaded post 110 and located between the base body 114 and the second threaded post 120. The positioning component 130 has an elastic arm 132, wherein the elastic arm 132 extends from the base body 114 to the second threaded post 120, and the end of the elastic arm 132 has a stop portion 132a. When one of the positioning portions 122 is aligned with the stop portion 132a disposed at the end of the elastic arm 132 with the rotation of the second threaded post 120 along the axis A, an extension direction of the stop portion 132a is parallel to an extension direction D (shown in FIG. 4) of the corresponding positioning portion 122 (i.e., the slot), such that the stop portion 132a may insert into the corresponding positioning portion 122. At this moment, the stop portion 132a is positioned in the positioning portion 122 of the second threaded post 120 through the elastic force of the elastic arm 132. Accordingly, after the threaded post structure 100 is adjusted to a predetermined length, the second threaded post 120 is prevented from rotating with respect to the first threaded post 110 due to an external force.

Referring to FIG. 1 and FIG. 2, in the present embodiment, the positioning component 130 has an opening 130a and is disposed around the post body 112 of the first threaded post 110 through the opening 130a. The internal edge of the opening 130a has a first interfering plane S1, and the external edge of the post body 112 has a second interfering plane S2. The first interfering plane S1 and the second interfering plane S2 are leaned to each other so that the structural interference between the first interfering plane S1 and the second interfering plane S2 may prevent the positioning component 130 from rotating along the axis A. As such, the rotation of the positioning component 130 with the second threaded post 120 rotating with respect to the first threaded post 110 may be prevented, in order that the effect of fixing the second threaded post 120 may surely be achieved. In other embodiments, the positioning component 130 can be fixed on the first threaded post 110 by any other appropriate methods, and the disclosure is not limited thereto.

Figure 5A:
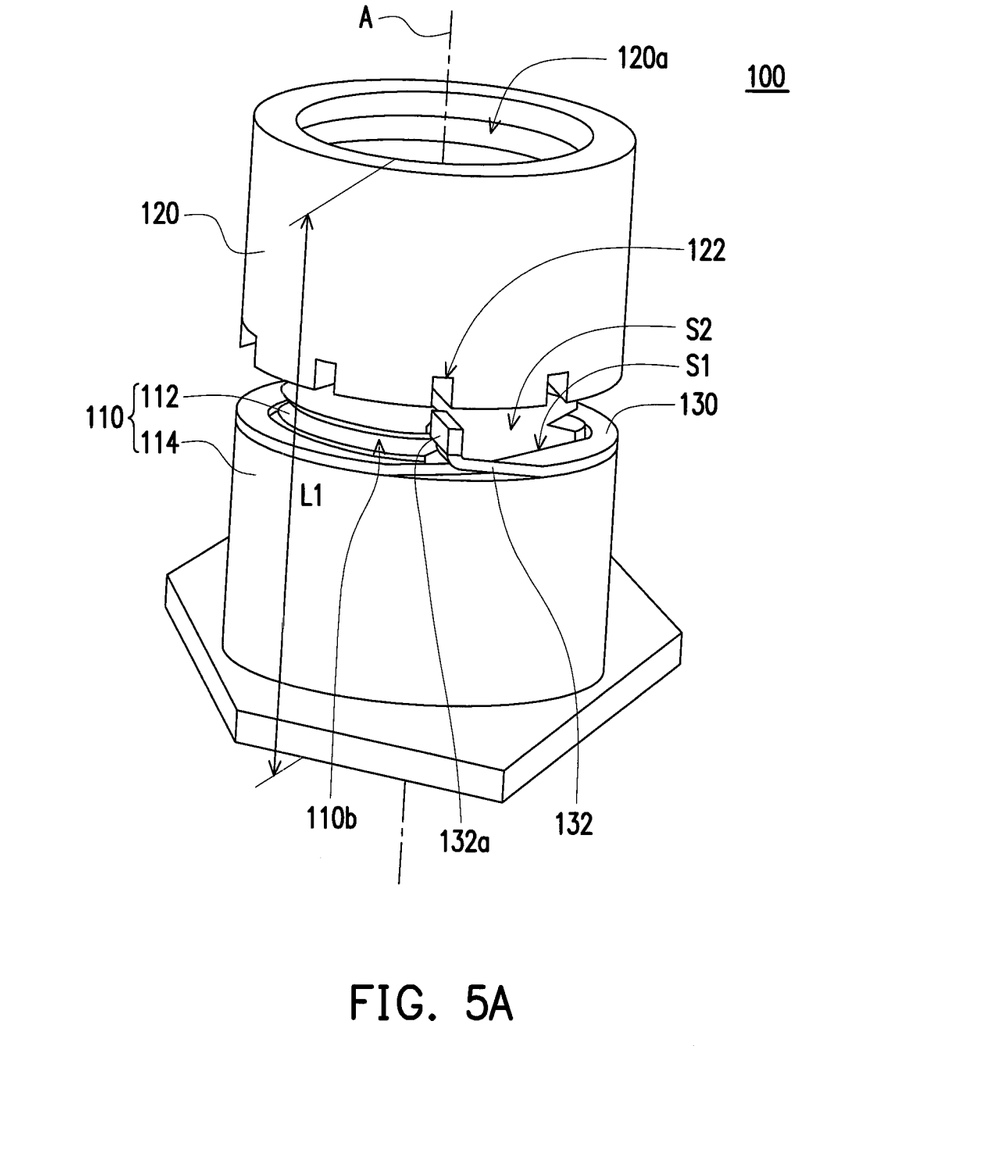
FIG. 5A to FIG. 5C illustrate adjusting the length of the threaded post structure of FIG. 1.
Figure 5B:
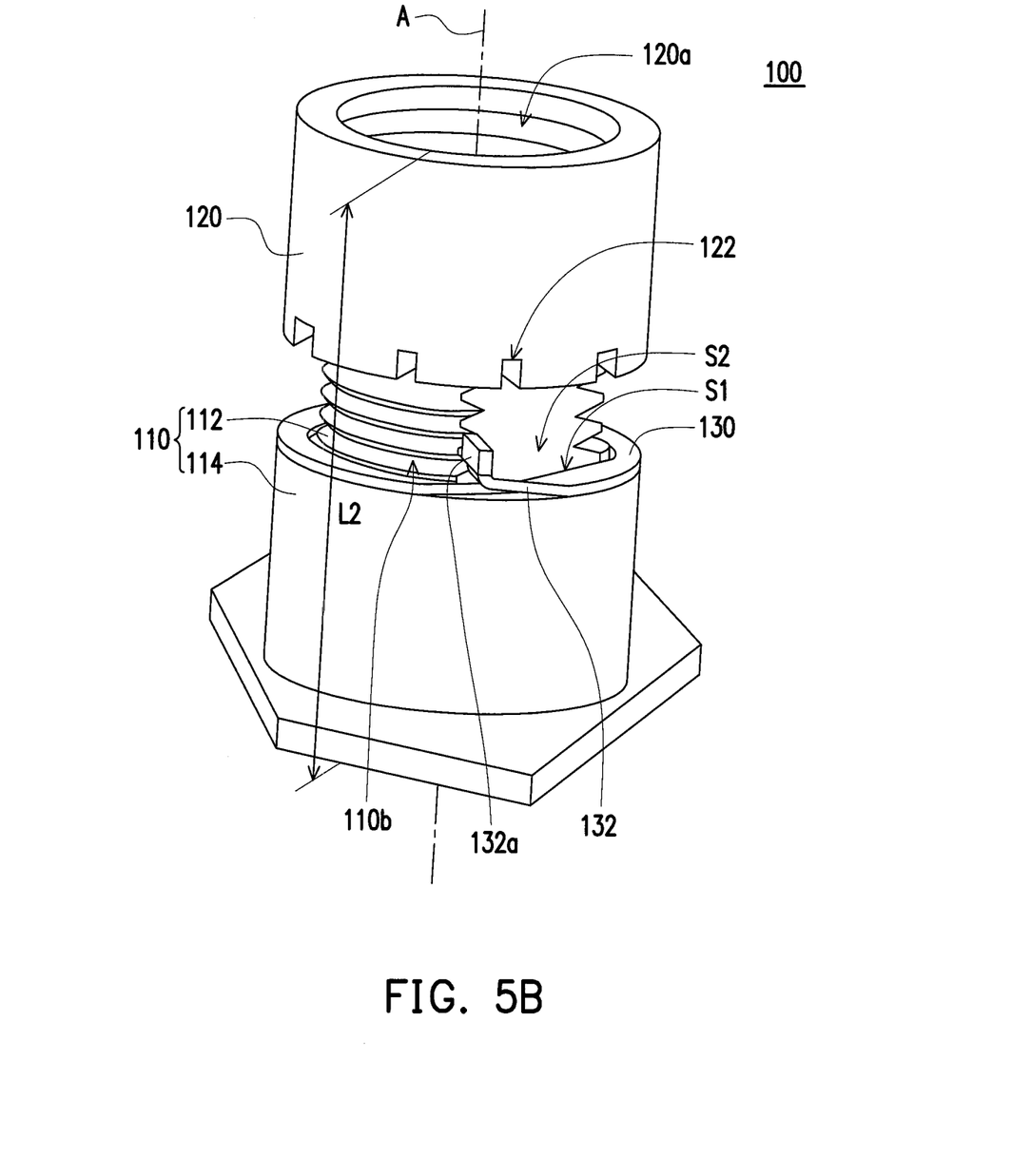
Figure 5C:
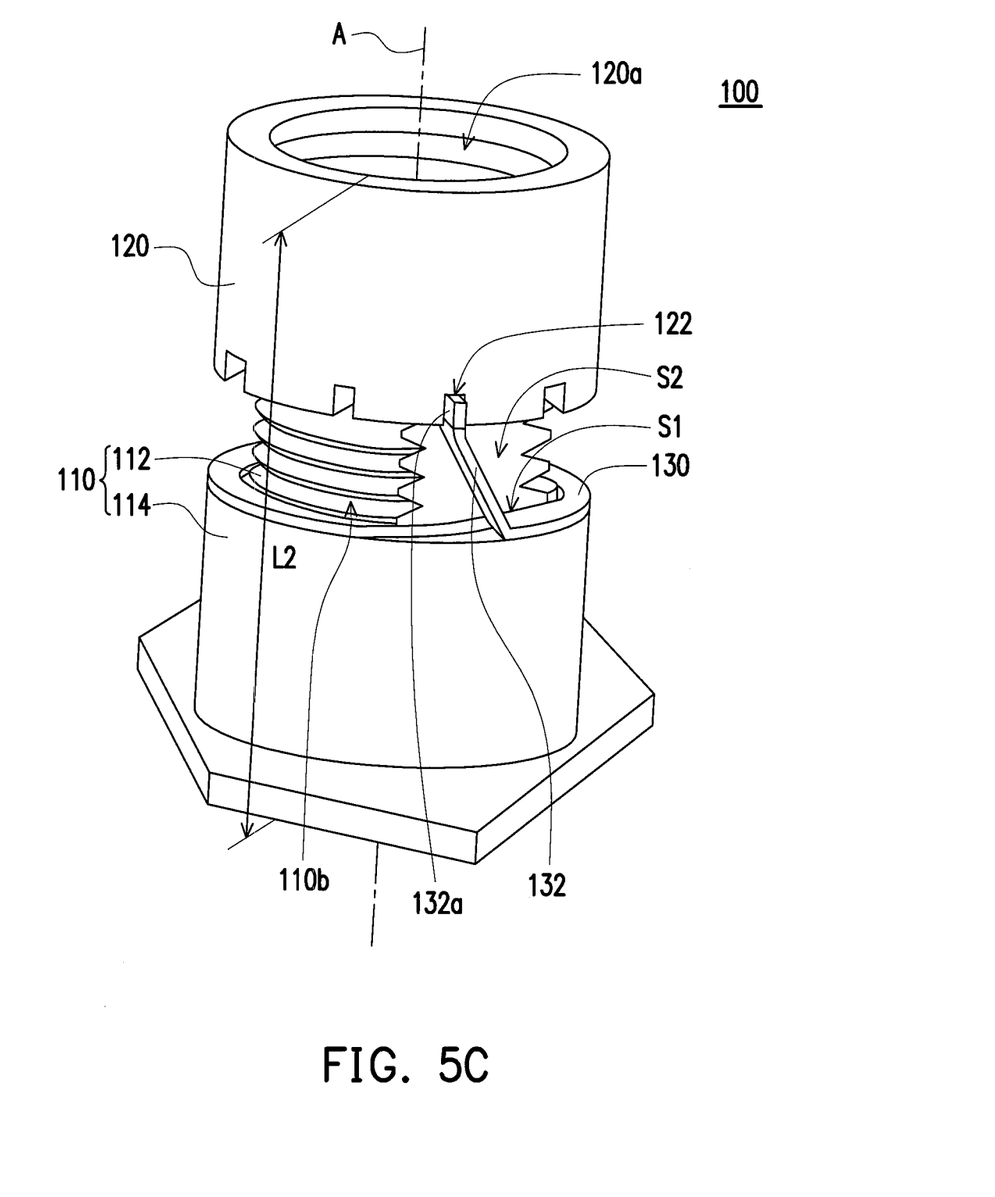

The way of adjusting the length of the threaded post structure 100 is specifically described in the following with figures. FIG. 5A to FIG. 5C illustrates adjusting the length of the threaded post structure of FIG. 1. When the second threaded post 120 rotates and moves along the axis A to a position shown in FIG. 1, the stop portion 132a of the positioning component 130 positions one of the positioning portions 122 of the second threaded post 120, in order to fix the second threaded post 120 at the position shown in FIG. 1, and at this moment the length of the threaded post structure 100 is L1. If the user wants to adjust the length of the threaded post structure 100, the elastic arm 132 may be compressed as shown in FIG. 5A so as to let the stop portion 132a remove from the positioning portion 122. At this moment, the positioning component 130 releases the second threaded post 120, the user may rotate the second threaded post 120 so that the second threaded post 120 moves along the axis A to another position shown in FIG. 5B, at this moment the length of the threaded post structure 100 is L2. Next, the elastic arm 132 springs upward as shown in FIG. 5C so that the stop portion 132a positions another one of the positioning portion 122 of the second threaded post 120, and the length adjustment of the threaded post structure 100 is completed.

In light of the foregoing, the threaded post structure provided in the disclosure includes the first thread post and the second threaded post, and thus the length of the threaded post structure can be adjusted through the relative rotations of first and second threaded posts, in order to meet various assembling requirements. Accordingly, the threaded post structure of the disclosure can replace the conventional threaded posts that their length cannot be adjusted in the assembling of electronic devices, so that the confusion due to the numerous types of threaded posts can be prevented, and the assembling quality may be enhanced. In addition, compared to the various types of conventional threaded posts which have different lengths and are difficult to be fabricated in mass production due to the different dimensions, the threaded post structure of the disclosure can be fabricated in a single process and mass production and provided for assembling the electronic devices, thus the manufacturing cost can be effectively reduced. Further, by using the positioning component located on the first threaded post, the second threaded post is positioned, and after the threaded post structure is adjusted to a predetermined length, the second threaded post is prevented from rotating with respect to the first threaded post due to an external force.

Although the present invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. A threaded post structure, comprising:
   a first threaded post, having a first internal thread and an external thread;
   a second threaded post, having a second internal thread and at least two positioning portions, wherein the first threaded post and the second threaded post are screwed with each other through the external thread and the second internal thread, and the second threaded post is adapted to rotate with respect to the first threaded post and move along an axis to adjust a length of the threaded post structure; and
   a positioning component, disposed on the first threaded post, wherein an interference between the positioning component and the first threaded post prevents the positioning component from rotating along the axis, when the second threaded post moves along the axis to a position, the positioning component positions one of the at least two positioning portions to fix the second threaded post at the position, and when the second threaded post moves along the axis to another position, the positioning component positions another one of the at least two positioning portions to fix the second threaded post at the another position.

2. The threaded post structure as claimed in claim 1, wherein the first threaded post is fixed on a first object, a screw element is screwed to the threaded post structure through the first internal thread, and a second object is sandwiched between the screw element and the second threaded post.

3. The threaded post structure as claimed in claim 1, wherein the first threaded post comprises:
   a post body, wherein the first internal thread and the external thread are formed on the post body; and
   a base body, connected to the post body, wherein the positioning component is leaned against the base body and positioned between the base body and the second threaded post.

4. The threaded post structure as claimed in claim 3, wherein the positioning component has an opening and is disposed around the post body through the opening, an internal edge of the opening has a first interfering plane, an external edge of the post body has a second interfering plane, and an interference between the first interfering plane and the second interfering plane prevents the positioning component from rotating along the axis.

5. The threaded post structure as claimed in claim 1, wherein the at least two positioning portions are a plurality of slots, the positioning component has a stop portion, and when one of the plurality of slots is aligned with the stop portion with the rotation of the second threaded post, an extension direction of the stop portion is parallel to an extension direction of the corresponding slot, and the stop portion inserts into the corresponding slot.

6. The threaded post structure as claimed in claim 1, wherein the positioning component has an elastic arm, and an end of the elastic arm positions one of the at least two positioning portions through an elastic force of the elastic arm.

7. The threaded post structure as claimed in claim 6, wherein the first threaded post comprises:
a post body, wherein the first internal thread and the external thread are formed on the post body; and
a base body, connected to the post body, wherein the positioning component is leaned against the base body and positioned between the base body and the second threaded post, and the elastic arm extends from the base body to the second threaded post.

8. The threaded post structure as claimed in claim 7, wherein the positioning component has an opening and is disposed around the post body through the opening, an internal edge of the opening has a first interfering plane, an external edge of the post body has a second interfering plane, and an interference between the first interfering plane and the second interfering plane prevents the positioning component from rotating along the axis.

9. The threaded post structure as claimed in claim 6, wherein the at least two positioning portions are a plurality of slots, the end of the elastic arm has a stop portion, and when one of the plurality of slots is aligned with the stop portion with the rotation of the second threaded post, an extension direction of the stop portion is parallel to an extension direction of the corresponding slot.

10. An assembling structure, comprising:
a first object;
a threaded post structure, comprising:
a first threaded post, fixed on the first object and having a first internal thread and an external thread;
a second threaded post, having a second internal thread and at least two positioning portions, wherein the first threaded post and the second threaded post are screwed with each other through the external thread and the second internal thread, and the second threaded post is adapted to rotate with respect to the first threaded post and move along an axis to adjust a length of the threaded post structure; and
a positioning component, disposed on the first threaded post, wherein an interference between the positioning component and the first threaded post prevents the positioning component from rotating along the axis, when the second threaded post moves along the axis to a position, the positioning component positions one of the at least two positioning portions to fix the second threaded post at the position, and when the second threaded post moves along the axis to another position, the positioning component positions another one of the at least two positioning portions to fix the second threaded post at the another position;
a screw element, screwed to the threaded post structure through the first internal thread; and
a second object, sandwiched between the screw element and the second threaded post.

11. The assembling structure as claimed in claim 10, wherein the first threaded post comprises:
a post body, wherein the first internal thread and the external thread are formed on the post body; and
a base body, connected to the post body, wherein the positioning component is leaned against the base body and positioned between the base body and the second threaded post.

12. The assembling structure as claimed in claim 11, wherein the positioning component has an opening and is disposed around the post body through the opening, an internal edge of the opening has a first interfering plane, an external edge of the post body has a second interfering plane, and an interference between the first interfering plane and the second interfering plane prevents the positioning component from rotating along the axis.

13. The assembling structure as claimed in claim 10, wherein the at least two positioning portions are a plurality of slots, the positioning component has a stop portion, when one of the plurality of slots is aligned with the stop portion with the rotation of the second threaded post, an extension direction of the stop portion is parallel to an extension direction of the corresponding slot, and the stop portion inserts into the corresponding slot.

14. The assembling structure as claimed in claim 10, wherein the positioning component has an elastic arm, and an end of the elastic arm positions one of the at least two positioning portions through an elastic force of the elastic arm.

15. The assembling structure as claimed in claim 14, wherein the first threaded post comprises:
a post body, wherein the first internal thread and the external thread are formed on the post body; and
a base body, connected to the post body, wherein the positioning component is leaned against the base body and positioned between the base body and the second threaded post, and the elastic arm extends from the base body to the second threaded post.

16. The assembling structure as claimed in claim 15, wherein the positioning component has an opening and is disposed around the post body through the opening, an internal edge of the opening has a first interfering plane, an external edge of the post body has a second interfering plane, and an interference between the first interfering plane and the second interfering plane prevents the positioning component from rotating along the axis.

17. The assembling structure as claimed in claim 14, wherein the at least two positioning portions are a plurality of slots, the end of the elastic arm has a stop portion, and when one of the plurality of slots is aligned with the stop portion with the rotation of the second threaded post, an extension direction of the stop portion is parallel to an extension direction of the corresponding slot.

* * * * *